US012623603B2

(12) United States Patent
Crandall et al.

(10) Patent No.: US 12,623,603 B2
(45) Date of Patent: May 12, 2026

(54) SUPPORT DEVICES FOR FACILITATING ACCESS TO A VEHICLE AND RELATED METHODS

(71) Applicant: Cord Group, LLC, Sunnyvale, TX (US)

(72) Inventors: Robert Crandall, Yorba Linda, CA (US); Dany Smith, Grand Prairie, TX (US)

(73) Assignee: Cord Group, LLC, Sunnyvale, TX (US)

( * ) Notice: Subject to any disclaimer, the term of this patent is extended or adjusted under 35 U.S.C. 154(b) by 755 days.

(21) Appl. No.: 18/050,367

(22) Filed: Oct. 27, 2022

(65) Prior Publication Data

US 2024/0140315 A1 May 2, 2024

(51) Int. Cl.
    *B60R 3/00* (2006.01)

(52) U.S. Cl.
    CPC .................................... *B60R 3/002* (2013.01)

(58) Field of Classification Search
    CPC .............. B60R 3/002; B60R 3/00; B60R 3/04
    See application file for complete search history.

(56) References Cited

U.S. PATENT DOCUMENTS

| | | | |
|---|---|---|---|
| 2,559,123 | A | 7/1951 | Jackson |
| 3,862,670 | A | 1/1975 | Hovey |
| 4,200,303 | A | 4/1980 | Kelly |
| 4,333,547 | A | 6/1982 | Johansson |
| D292,904 | S | 11/1987 | Bielby |

| | | | |
|---|---|---|---|
| 4,935,638 | A | 6/1990 | Straka |
| 5,046,582 | A | 9/1991 | Albrecht |
| D340,905 | S | 11/1993 | Orth, Sr. et al. |
| 5,732,996 | A | 3/1998 | Graffy et al. |
| 5,895,064 | A | 4/1999 | Laubach |
| 6,435,534 | B1 | 8/2002 | Stone |
| D474,435 | S | 5/2003 | Lund et al. |
| 6,588,783 | B2 | 7/2003 | Fichter |
| 6,641,158 | B2 | 11/2003 | Leitner |
| 6,709,137 | B1 | 3/2004 | Glovak et al. |
| 6,830,257 | B2 | 12/2004 | Leitner |
| 6,834,875 | B2 | 12/2004 | Leitner et al. |
| 6,874,801 | B2 | 4/2005 | Fichter |
| 7,007,961 | B2 | 3/2006 | Leitner et al. |
| 7,055,839 | B2 | 6/2006 | Leitner |

(Continued)

FOREIGN PATENT DOCUMENTS

| | | |
|---|---|---|
| EP | 0210465 | 2/1987 |

OTHER PUBLICATIONS

Photgraph showing an Off-Road Accessory 'N-Fab A Step Above . . . '; Specialty Equipment Market Association (SEMA) Show; Las Vegas, Nevada; Oct. 30, 2012.

*Primary Examiner* — James A Shriver, II
*Assistant Examiner* — Nicholas R. Kandas

(57) ABSTRACT

A support device and components thereof can include a stepping cover attached a support frame. The support device has a length that is shorter than the length of a side of the vehicle between the front and rear wheel wells to facilitate access to a single vehicle door of a multiple door vehicle, such as a rear passenger door of a four-door vehicle. The support frame of the support device may be configured to be mounted to the underbody of the vehicle, and the stepping cover is configured to provide a stepping surface for the passenger to use the support device.

17 Claims, 11 Drawing Sheets

(56) References Cited

U.S. PATENT DOCUMENTS

| | | | |
|---|---|---|---|
| D535,928 S | 1/2007 | Crandall | |
| D546,745 S | 7/2007 | Storer | |
| 7,287,770 B2 | 10/2007 | Drabant et al. | |
| D567,729 S | 4/2008 | Crandall | |
| 7,360,779 B2 * | 4/2008 | Crandall | B60R 3/002 |
| | | | 248/231.91 |
| 7,398,985 B2 | 7/2008 | Leitner et al. | |
| 7,413,204 B2 | 8/2008 | Leitner | |
| 7,416,202 B2 | 8/2008 | Fichter | |
| 7,434,825 B2 | 10/2008 | Williams | |
| 7,566,064 B2 | 7/2009 | Leitner et al. | |
| 7,584,975 B2 | 9/2009 | Leitner | |
| 7,717,444 B2 | 5/2010 | Fichter | |
| 7,909,344 B1 | 3/2011 | Bundy | |
| 7,946,604 B2 | 5/2011 | Crandall | |
| 8,152,187 B1 | 4/2012 | Crandall | |
| 8,157,277 B2 | 4/2012 | Leitner et al. | |
| D665,713 S | 8/2012 | Pochurek et al. | |
| D671,874 S | 12/2012 | Kekich, Jr. et al. | |
| 8,408,571 B2 | 4/2013 | Leitner et al. | |
| 8,448,968 B1 | 5/2013 | Grote et al. | |
| 8,641,068 B1 | 2/2014 | Bundy | |
| 8,702,284 B2 | 4/2014 | Huang-Tsai | |
| 8,827,293 B1 | 9/2014 | Bundy | |
| 8,844,957 B2 | 9/2014 | Leitner et al. | |
| 9,096,176 B2 | 8/2015 | Muhe-Sturm et al. | |
| 9,302,626 B2 | 4/2016 | Leitner et al. | |
| D757,622 S | 5/2016 | Wolf | |
| 9,561,751 B2 | 2/2017 | Leitner et al. | |
| 10,053,017 B2 | 8/2018 | Leitner et al. | |
| 10,556,560 B2 | 2/2020 | Rife et al. | |
| 2003/0006576 A1 * | 1/2003 | Lanoue | B60R 3/002 |
| | | | 280/163 |
| 2007/0290475 A1 | 12/2007 | Reitinger | |
| 2012/0104718 A1 | 5/2012 | Alvarez et al. | |
| 2012/0228848 A1 | 9/2012 | Fichter | |
| 2013/0221632 A1 | 8/2013 | Higgs et al. | |
| 2015/0175059 A1 | 6/2015 | Dellock et al. | |
| 2015/0183376 A1 | 7/2015 | Fichter | |
| 2016/0059774 A1 | 3/2016 | Crandall et al. | |
| 2016/0288718 A1 | 10/2016 | Hayes et al. | |
| 2016/0355138 A1 | 12/2016 | Smith et al. | |

* cited by examiner

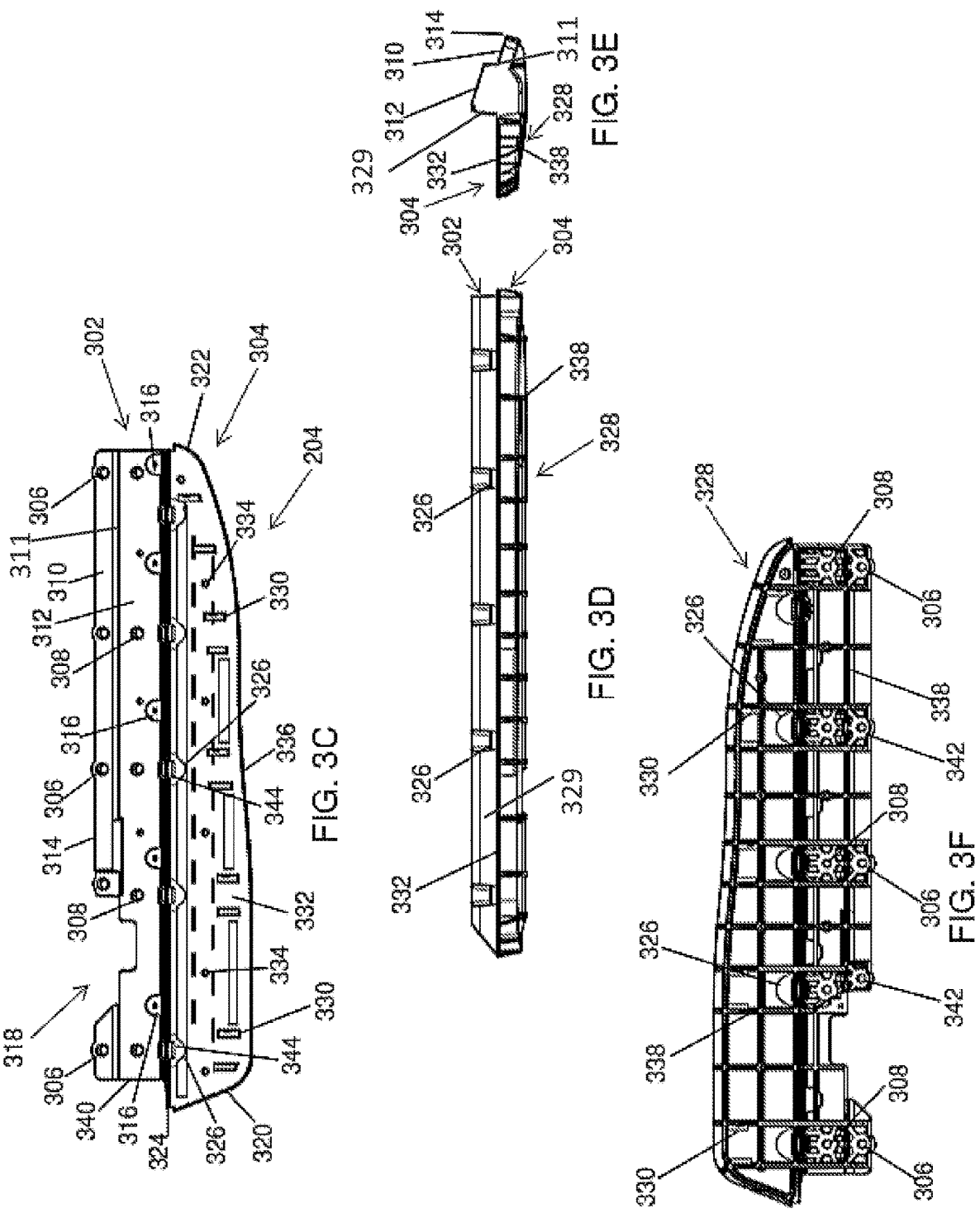

SUPPORT DEVICES FOR FACILITATING ACCESS TO A VEHICLE AND RELATED METHODS

FIELD OF ART

The field of the invention relates to systems and methods for facilitating entry and exit from a vehicle.

BACKGROUND

Vehicles provide transportation for people and objects over distances. While many vehicles are low to the ground or have otherwise easily accessible passenger compartments, some do not and entry and exit may present a challenge. Typical examples of vehicles with more difficult access to passenger compartments include pickup trucks, sport-utility vehicles, off-road vehicles, "raised" or "lifted" automobiles and others. In these types of vehicles, the passenger compartment or compartments may be located at a height which makes entry and exit challenging for children, the elderly or infirm, and even for normal abled-body adults.

Various solutions are available for addressing the access issue to a passenger's compartment including the use of running boards, attached step-ladders, handles to assist a passenger in pulling themselves up, and others. However, existing solutions can use improvements.

SUMMARY

A support device attached outside of a passenger door of a vehicle is disclosed herein. The support device may have two main components: a stepping cover and a support frame. The stepping cover is configured to be attached on top of the support frame and provide a surface for the passenger to step on to enter and exit the passenger compartment of the vehicle or to reach the rooftop of the vehicle. The support frame has a plurality of bolt holes configured to fasten the support device to the underbody of the vehicle near the passenger doors. The support device is configured to attach and occupy the region around a single passenger door, and a plurality of support devices may be used with the vehicle for each passenger door.

BRIEF DESCRIPTION OF THE DRAWINGS

These and other features and advantages of the present devices, systems, and methods will become appreciated as the same becomes better understood with reference to the specification, claims and appended drawings wherein:

FIG. 3C is a top view of the support frame of the support device, in accordance with aspects of the invention.

FIG. 3D is a front view of the support frame of the support device, in accordance with aspects of the invention.

FIG. 3E is a side view of the support frame of the support device, in accordance with aspects of the invention.

FIG. 3F is a bottom view of the support frame of the support device, in accordance with aspects of the invention.

DETAILED DESCRIPTION

The detailed description set forth below in connection with the appended drawings is intended as a description of the presently preferred embodiments of support members provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figures 1A, 1B:
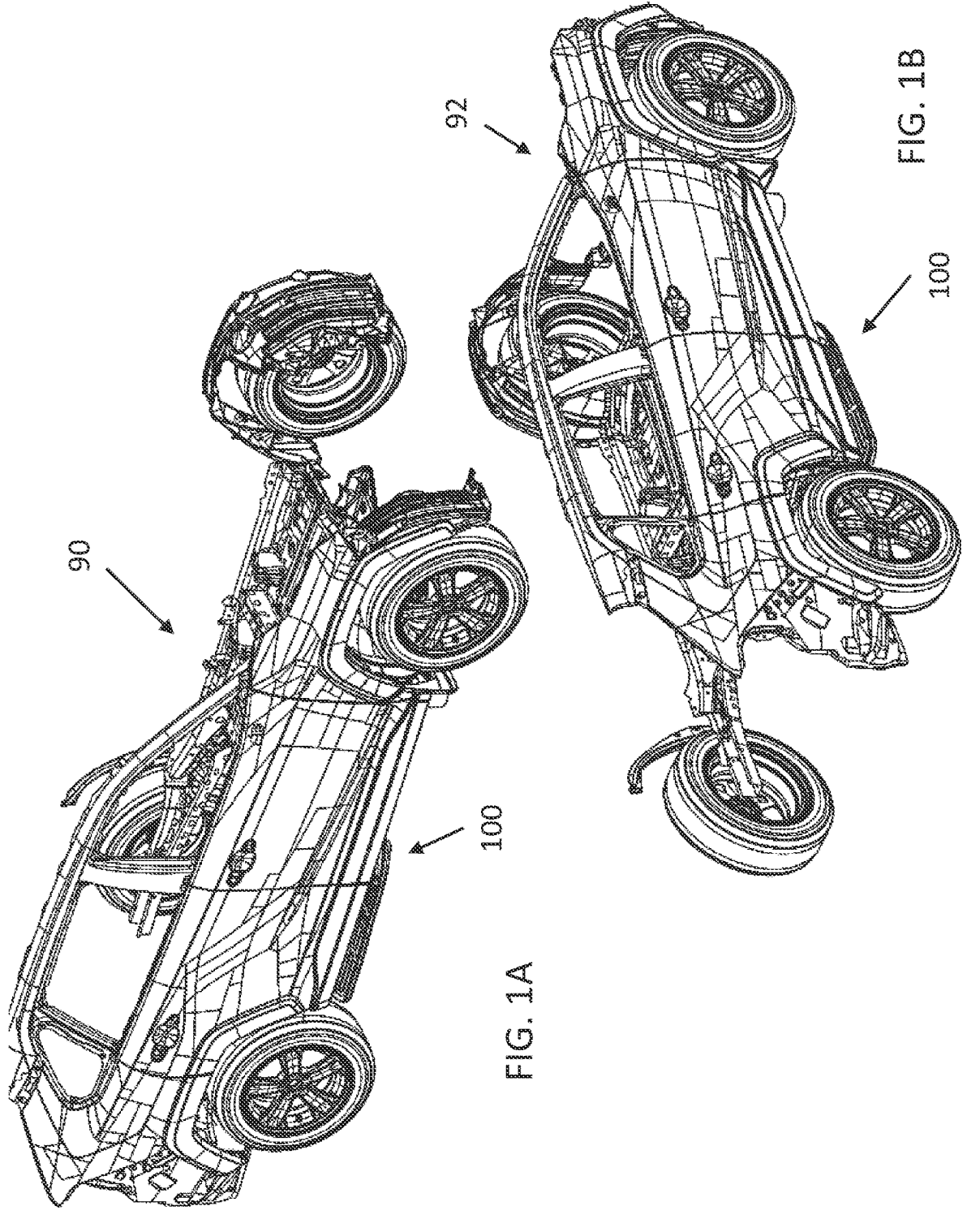
FIG. 1A is a side partial perspective view of a vehicle with a support device mounted next to the rear passenger door, in accordance with aspects of the invention.
FIG. 1B is a side partial perspective view of another vehicle with the support device mounted next to the rear passenger door, in accordance with aspects of the invention.

FIG. 1A and FIG. 1B show side partial perspective views of two different vehicles 90, 92 each with a support device 100 in accordance with aspects of the invention mounted therewith. As shown, the vehicle 90 of FIG. 1A can be an SUV or a 4×4 vehicle and the vehicle 92 of FIG. 1B can be a passenger vehicle or sedan. In other examples, the vehicles can be a truck with a 4-door extended cab, a van, a mini-van, etc. As further discussed below, the support device 100 can have a length from a first end to an opposite second end and wherein the length of the support device can be up to about 65% of the length of the vehicle between the front and back wheel wells of the vehicle, and specifically the car frame at the rearward part of the front wheel well and the forward part of the rear wheel well. For example, the length can be 65% or less, 60% or less, or 55% or less, than the length of the vehicle between the front and rear wheel wells. Being less than the length of the vehicle between the front and back or rear wheel wells, the present support device 100 is configured to be mounted adjacent the rear passenger door, such as to support a passenger during ingress and egress to and from the rear passenger compartment or to support the passenger when standing on the support device 100 to reach areas of the roof of the vehicle, such as when accessing items mounted in a cargo container box attached to the roof rack.

In an example and as further discussed below, the support device 100 can have a substantially flush surface with a plurality of projections or surface textures to facilitate gripping with a passenger's feet to step on to enter and exit the vehicle or to reach the rooftop of the vehicle. The support device 100 may have a front end aligned with the front of the vehicle and a rear end at the opposite end, wherein the rear end can have a width that is wider than the width at the front end, measured from a common referenced plane or line. With the different widths at the two ends, the support device 100 tapers from the rear end towards the narrower front end. The relative widths provide sufficient support surface where needed and a smaller surface profile where the need is less, such as at the front end. The taper also helps to reduce wind resistance or drag. In other examples, the front end and the rear end of the support device can have approximately the same width so that no noticeable tapering can be gleaned with the naked eye. Relative to a vertical plane defined by the rear passenger door, the support device, in an example, extends outwardly of the vertical plane a varying amount from between the forward end and rear end. Each support device 100 is configured to substantially occupy the area under one passenger door on one side of the vehicle but may extend partially past the midway point of the vehicle towards a second passenger door.

In another example, the support device 100 may only occupy the area under one passenger door. As a result, the support device 100 may be considered a short step running board. In a preferred example, the support device 100 is configured to be mounted adjacent the rear passenger door of a four-door vehicle, or a sliding door of a mini-van. Said differently, the support device 100 is configured to be mounted near the rear passenger door such that the rear end is closer to the rear wheel well than the front end is to the front wheel well. Preferably, the rear end is substantially closer to the rear wheel well than the front end is to the front wheel well.

The support device 100 in accordance with aspects of the invention may be mounted to the underbody of the vehicle as described elsewhere herein. By way of example, the support device 100 may be mounted under each of the rear passenger doors of the vehicle of a four-door vehicle, where the support device 100 extends outwards from a vertical plane defined by the passenger door to provide a stepping surface for the passenger, as shown in FIG. 1A and FIG. 1B. Because the support device 100 has a length of up to about 65% of the length of the vehicle between the front and rear wheel wells, the support device will generally be located nearer the rear passenger door than the front driver or passenger door. In a particular example, the length of the support device is about 80% to about 115% of the length of the vehicle measured from the rear wheel well to the structural mid-point of the vehicle frame, where the front and rear doors on one side of the vehicle meet.

The length of the support device 100 and the placement of the support device 100 on the vehicle nearer the rear wheel well than the front wheel well not only facilitate ingress and egress to and from the vehicle but provides a surface for a user or passenger to stand on to reach various points or sections of the vehicle above the roof, such as to access a car top carrier or rooftop cargo carrier mounted on the roof of the vehicle. Further, for a typical car top carrier or rooftop cargo carrier, the location of the present support device 100 being closer to the rear wheel well than the front wheel well provides the user with a more advantageous access point on the support platform to stand on to access the car top carrier, which can eliminate the need for a full length running board or full length support device since it is not convenient to stand at the front passenger or driver car door to access the car top carrier that is usually shifted towards the rear of the vehicle roof.

Figures 1C, 1D:
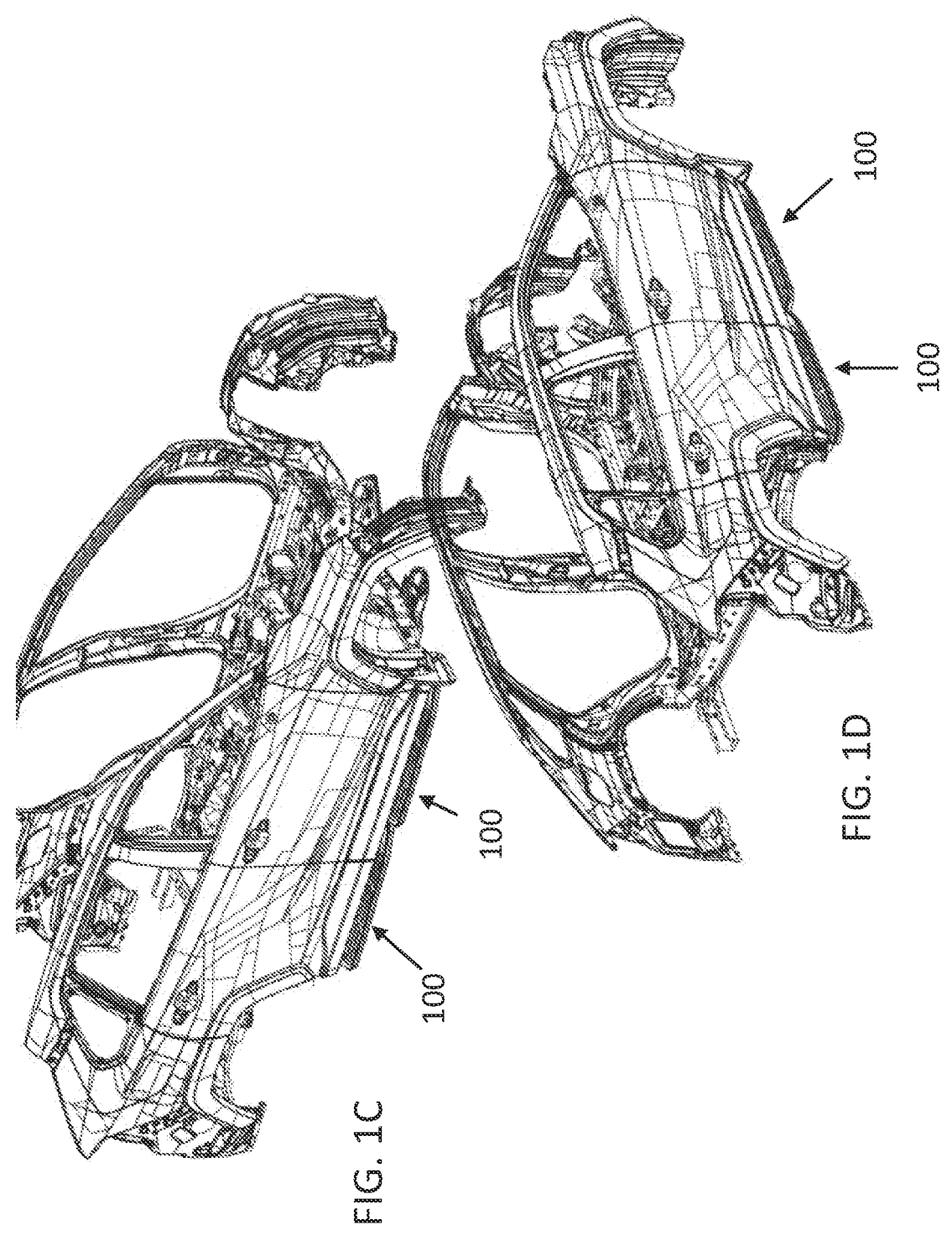
FIG. 1C is a side partial perspective view of a vehicle with a plurality of support devices mounted next to the passenger doors, in accordance with aspects of the invention.
FIG. 1D is a side partial perspective view of another vehicle with a plurality of support devices mounted next to the passenger doors, in accordance with aspects of the invention.

In another example, a support device 100 may be mounted under each passenger door or only one passenger door of the vehicle. For example, in a four-door vehicle, three, two or one support device 100 may be mounted to the three, two, or one passenger door of the four-door vehicle. If only one or two support devices are mounted to the vehicle, the one or two support devices are preferably mounted adjacent the one or two rear passenger doors. As shown in FIG. 1C and FIG. 1D, the front and rear passenger doors of a vehicle may each have a separate support device 100 mounted for use by the passengers. It is also contemplated that a similar support device 100 may be mounted under the driver door of the vehicle. While the support device 100 may be installed on a passenger vehicle, such as a sedan, to facilitate access to hard-to-reach areas on the roof, the support device 100 is particularly useful on vehicles that have high ground clearance where the passenger compartments are high off the ground. Such vehicles include, but not limited to, pickup trucks, sport-utility vehicles, and off-road vehicles. The support device 100 provides passengers a stepping surface to get inside and outside the vehicle or to reach the rooftop of such vehicle.

Figures 2A, 2B:
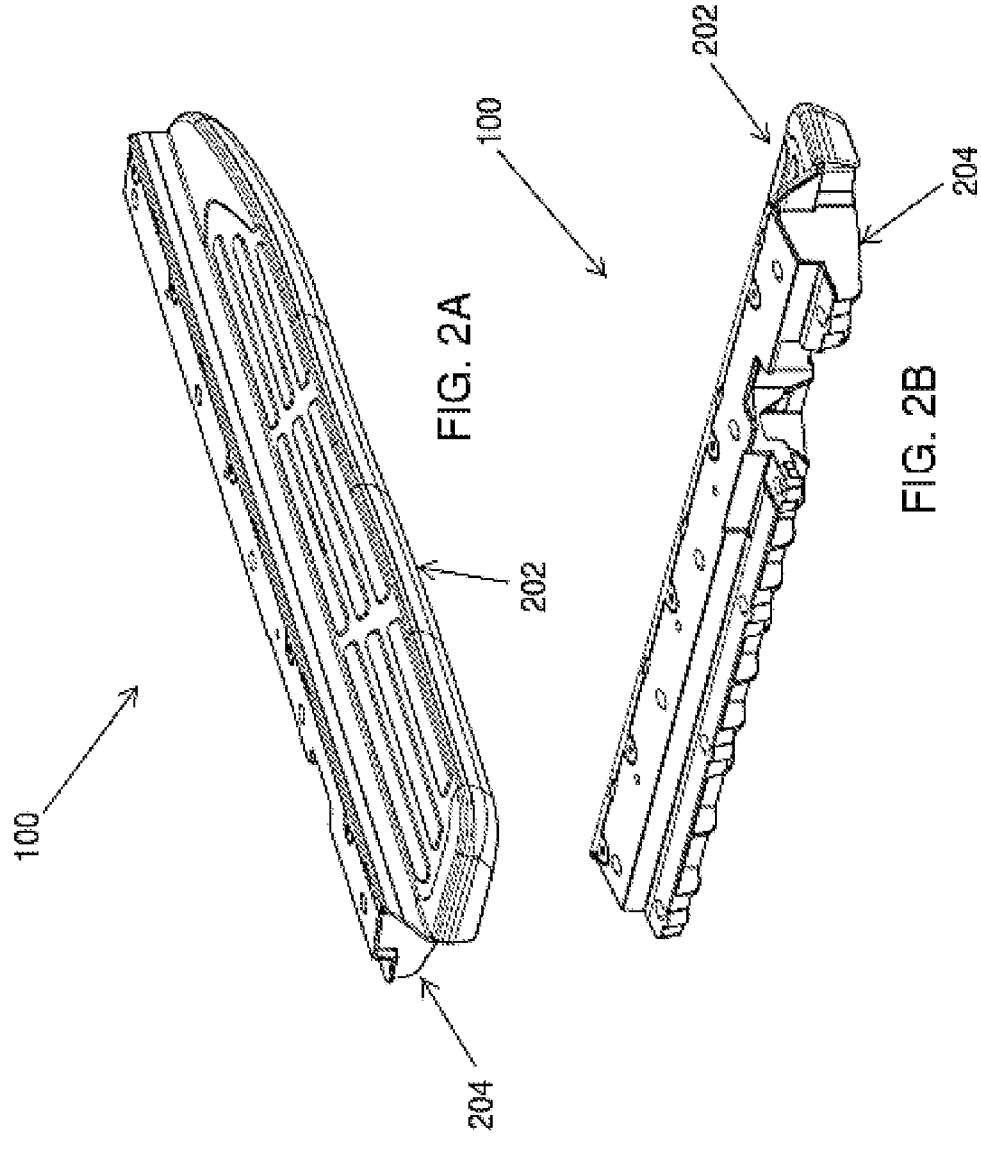
FIG. 2A is a front perspective view of the support device, in accordance with aspects of the invention.
FIG. 2B is a rear perspective view of the support device, in accordance with aspects of the invention.

FIG. 2A and FIG. 2B show a front perspective view and a rear perspective view, respectively, of a support device 100 in accordance with aspects of the invention. The support device 100 may comprise of a first support component 202 secured to a second support component 204. In a particular example, the first support component 202 can be a stepping cover or a cover layer 202 and the second support component 204 can be a support frame 204. The stepping cover 202 can be separately formed or manufactured and subsequently attached to the support frame 204 to provide the passenger a surface to step on to get inside and outside the vehicle or to reach the rooftop of the vehicle. In an alternative example, the stepping cover 202 may be integrated with the support frame 204 as a one-piece component, including by co-molding or over-molding two different molding materials to form the support device as an integrated unit. The stepping cover 202 can attach to the support frame 204 by an engagement mechanism, by a fastening mechanism, or by a combination of both the engagement mechanism and the fastening mechanism to affix the two components 202, 204 together.

Preferably, the stepping cover 202 is attached to the support frame 204 before the support device 100 is fastened to the underbody of the vehicle and be used as a support structure with a stepping surface to enable enter and exit of the vehicle as described elsewhere herein. Less preferred, the support frame 204 can first attach to the underbody of the vehicle and then the cover layer 202 is attached to the support frame 204 thereafter. The support device 100 may be fastened to the underbody of the vehicle using fastener mechanisms with a set of bolt holes provided with the support frame 204. In an example, a first set of bolt holes 306 and a second set of bolt holes 308 can be provided with the support frame for use with the fasteners to fasten the support frame to the vehicle.

Figures 3A, 3B:
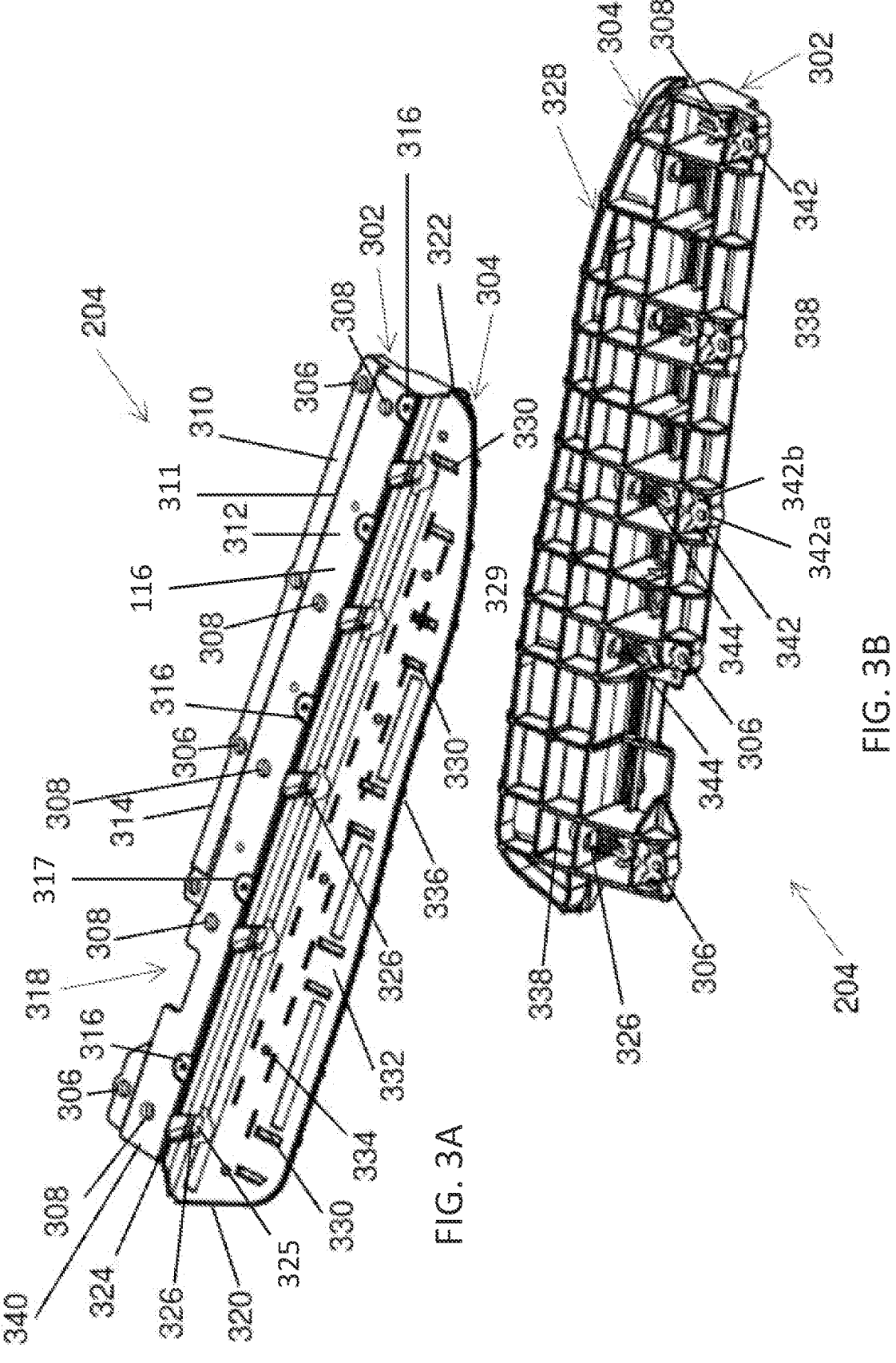
FIG. 3A is a top perspective view of the support frame of the support device, in accordance with aspects of the invention.
FIG. 3B is a bottom perspective view of the support frame of the support device, in accordance with aspects of the invention.

Referring initially to FIG. 3A and FIG. 3C, which show a top perspective view and a top view, respectively, of the support frame 204 of the support device 100, various exemplary details of the support frame will now be discussed. The support frame 204 has a body 116 with a mounting section 302 and a supporting section 304. The mounting section 302 is configured to be fastened to the underbody of the vehicle and, as a result, may not be visible to the passenger when using the support device 100. The supporting section 304 is configured to engage and support the stepping cover or cover layer 202. Thus, the supporting section 304 of the support frame may have a corresponding shape as the stepping cover 202 to couple with the stepping cover.

In use, the supporting section 304 is exposed laterally of the vehicle but is covered by the cover layer 202, for a two-component support device. The mounting section 302 can have a length and the supporting section 304 can have a length and wherein the two lengths are equal or the length of the supporting section 304 can be longer than the length of the mounting section 302. The mounting section 302 can have a solid continuous body section between the front end and the rear end of the body 116, with bolt holes, cut-outs or various features incorporated within the solid continuous body section.

In an example, the body 116 of the mounting section 302 has a first set of bolt holes 306 and a second set of bolt holes 308 configured to receive fastening elements for the fastening of the support frame 204 to the underbody of the vehicle. The mounting section 302 may have tiered or different surface levels. In an example, a lower or first surface level 310 and a second or upper surface 312 can be provided with the mounting section 302 where the first set of bolt holes 306 may be on the lower surface level 310 and the second set of bolt holes 308 may be on the upper surface level 312.

A first riser 311 having a surface that is generally vertical or substantially vertical can be located between the two different surface levels or elevations 310, 312. In another example, the mounting section 302 may have one flush surface or a single surface level having both the first and second set of bolt holes 306, 308 instead of on two different surface levels. The mounting section 302 can be adjusted to mate with the structure of the vehicle's underbody. Thus, whether to incorporate multiple surface levels or a single surface level can depend on the vehicle for which the support frame is to attach.

By way of example, the first set of bolt holes 306 may include between 3 to 8 bolt holes. The bolt holts 306 may be randomly spaced, evenly spaced, or spaced at desired locations on the body 116 to receive fasteners at designated locations on the vehicle. The first set of bolt holes 306 may be threaded or unthreaded.

By way of example, the second set of bolt holes 308 may range between 3 to 8 bolt holes. In a preferred example, the number of bolt holes of the second set of bolt holes 308 can be the same as the number of bolt holes of the first set of bolt holes 306. The second set of bolt holts 308 may be randomly spaced, evenly spaced, or spaced at desired locations on the body 116 to receive fasteners at designated locations on the vehicle. In some examples, each bolt hole from the second set of bolts holes 308 aligns withs each corresponding bolt hole of the first set of bolt holes 306. In an example, each of the second set of bolt holes 308 may be threaded or unthreaded. The body 116 may incorporate another set of fastening holes 316 apart from the first and second set of fastening holes, which may be called a third set of fastening holes. The third set of fastening holes 316 may be used to fasten the stepping cover or cover layer 202 to the support frame 204 if fasteners are used instead of or in addition to detent or snap fit mechanisms.

By way of example, the third set of fastening holes 316 may have between 3 to 8 fastening holes that may be randomly spaced, evenly spaced, or spaced at desired locations on the body 116 to receive fasteners to secure the cover layer 202. While the holes of the third set of fastening holes 316 can align with the respective bolt holts of the first and second set of bolt holes, the holes of the third set of bolt holes are preferably not aligned. The holes of the third set of holes may be threaded or unthreaded. In an example, the bolt holes of the third set of bolt holes 316 are located on the upper surface level 312 of the body. In an alternative embodiment, the fastening holes 316 may be replaced by a different fastening mechanism, such as an integral fastening mechanism, including but not limited to embossed protrusions and edge seams. For example, in an alternative embodiment instead of utilizing the third set of fastening holes 316, the upper surface 312 may incorporate rounded recesses 317 with each comprising a boss or a projection.

When the cover layer or stepping cover 202 is coupled to the support frame 204, mating structural features of the cover layer 202 can then engage the corresponding rounded recesses 317 and the projections of the rounded recesses 317 projecting into openings on the mating structural features on the cover layer 202, as further discussed below. This alternative engagement further prevents the stepping cover 202 from separating from the support frame 204 and when further abutted against the underside surface of the vehicle when in the installed position, the engagement is substantially permanent and secured. In another example, the mating structural features of the stepping cover 202 and the projections of the rounded recesses 317 of the support frame 204 may interchange with each other where the stepping cover 202 may have the projections or bosses and the support frame 204 may have the mating structural features.

The body 116 has a boundary edge 324 between the mounting section 302 and the supporting section 304. The boundary edge 324 roughly represents a line on the body 116 in which part of the body will be hidden from view or exposed to viewing depending on which side of the line the part of the body is situated when the support frame 204 is mounted to the vehicle. In an example, a plurality of detent pockets 325 are provided at or near the boundary edge 324 of the body 116. Each detent pocket 325 has an opening 326 and a lip or detent within the pocket to receive a corresponding male detent from the stepping cover or cover layer 202, which is shown in FIG. 4B, to engage therewith when assembling the cover layer 202 to the support frame 204, as further discussed below. In the example shown, the opening 326 of each detent pocket 325 can straddle the boundary edge 324 and part of the circumference can be located on the mounting section 302 side of the line. In another example, the opening 326 of each detent pocket 325 can extend across the boundary edge and occupy both the mounting section 302 and the supporting section 304. In an example, the boundary edge 324 is located at an upper end of a second riser 329, at the upper surface level 312. The second riser 329 has a generally upstanding wall surface separating the upper surface level 312 and the contact surface 332 of the supporting section 304, which is lower, elevation-wise, than the upper surface level 312.

In the example shown, each detent pocket 325 comprises a recess or indentation at the second riser 329 and a through hole at the contact surface 332. The opening 326 of the detent pocket therefore has a partial circumference at the upper surface level 312, at the second riser 329, and an enclosed circumference at the contact surface 332 below the upper surface level 312. Each opening can have three connected edges at the second riser 329 and a square or rectangular circumference at the contact surface 332. In other examples, the opening can be a curved arc at the riser and an oval or round circumference at the contact surface 332. In an example, the set of openings of the detent pockets may number between 3 to 8 openings spaced randomly or equally along the boundary edge 324 and second riser 329.

The shape of the mounting section 302 may be generally rectangular. As shown in FIG. 3E, the lower surface 310 and the upper surface 312, being on two different elevations, may be angled where the upper surface 312 slopes downwards from a high end at the second riser 329 to a lower end at the first riser 311, and the lower surface 310 slopes downwards from a high end at the first riser 311 towards the side edge 314. Such downward slopes may help in the installation of the stepping cover 202, shown in FIG. 4A, to the support frame 204 and may help the installation of the support frame 204 to the underbody of the vehicle. In another example, the sloping of the upper surface 312 and the lower surface 310 may be practiced in the reverse direction where the upper surface 312 slopes downwards from the first riser 311 to the second riser 329 and the lower surface 310 slopes downwards from the side edge 314 to first riser 311. In another example, a combination of sloping surfaces as previously described may be implemented to the upper surface 312 and the lower surface 310.

As shown in FIG. 3A and FIG. 3C, a gap or cut-out 318 may exist towards the rear end 340 of mounting section 302 configured for the jacking point of the vehicle to occupy the gap 318 and allow a user to lift the vehicle with a jack. The cut-out 318 interrupts the continuous length of the side edge 314. When the support device 100 is installed under the rear passenger door, the gap 318 would be located near the rear wheel well of the vehicle since the jacking point of rear wheels are ordinarily located around the rear wheel well of the vehicle. As shown in FIG. 3C, the gap 318 may occupy the upper surface 312 and the lower surface 310 where the gap 318 may be between some of the bolt holes of the first set of bolt holes 306 and between some of the bolt holes of the second set of bolt holes 308. In an example, the gap 318 may have a bigger opening on the lower surface 310 than the upper surface 312.

As shown in FIG. 3E, the contact surface 332 of the supporting section 304 may be at a lower level relative to the upper surface 312 of the mounting section 302 so that the stepping cover 202 would substantially be on the same level as the mounting section 302 when attached to the support frame 204, as shown in FIG. 2A and FIG. 2B. In an example, the contact surface 332 may be on the same level as the lower surface 310. In another example, the contact surface 332 may be on the same level as the upper surface 312.

In an example, as shown in FIG. 3A and FIG. 3C, the contact surface 332 of the supporting section 304 has a plurality of slots 330 for receiving protrusion tabs 420 located on the undersurface of the stepping cover 202, which are shown in FIG. 4E. Engagement between the slots 330 and the tabs 420 align the support frame and the stepping cover, such as to bring the two into close registration during assembly, as further described below. The engagement may also create a locking effect that prevents the stepping cover 202 from sliding off the contact surface 332, or at least resists the possibility of relative sliding between the two. Such plurality of slots 330 may be randomly spaced, evenly spaced, or spaced at desired locations throughout the elongated length of the supporting section 304. By way of example and not limitation, the plurality of slots may include between 4 to 16 slots distributed along the elongated length of the supporting section 304.

The contact surface 332 of the support frame 204 may have a fourth set of fastening holes 334 configured to receive fastening components, such as screws, to fasten the stepping cover 202 to the supporting section 304 of the support frame 204. By way of example, the fourth set of fastening holes 334 may include between 3 to 8 holes that may be randomly spaced, evenly spaced, or spaced at desired locations from each other, and the fastening holes 334 may be threaded or unthreaded for receiving complementary fastening components. For example, the fourth set of fastening holes 334 may be replaced by another fastening mechanism, such as an integral fastening mechanism, detents, or embossed protrusions, to name a few non-limiting examples.

The supporting section 304 may have substantially the same shape as the stepping cover 202 as described elsewhere herein. For example, the supporting section 304 and the stepping cover 202, which seats atop the supporting section, may have complementary surfaces so that they form a close or tight fit when assembled. In a particular example, the supporting section 304 has a rear end or edge 320 that is wider than the opposing front end edge or rend 322, and the long edge or primary edge 336 is located between the two end edges 320, 322 may taper, when viewed from above from a wider end at the rear edge towards the narrower front edge 322. It is noted that the widths are with respect to a reference plane or line, such as the plane or line defined by the riser 329. Further, when mounted to a vehicle, the term front end or edge and rear end or edge are relative to the vehicle. Thus, the front edge 322 is understood to mean closer to the front of the vehicle and the rear edge 320 is understood to be further from the front of the vehicle, relative to the front edge.

In an example, the narrowing or tapering of the primary edge 336 may extend the entire length of the primary edge. In another example, the tapering starts at about the halfway or midway point of the supporting section 304 and then tapers as it extends towards the front edge 322. The rear edge 320 and the front edge 322 may alternatively be referred to as first edge 320 and second edge 322, respectively. In an example, the tapering may non-linear or constant, as shown in FIG. 3A and FIG. 3C. In this way, the relative widths of the rear end or edge 320 and the front end or edge 322 provide sufficient support surface where needed and a smaller surface profile where the need is less, such as at the front end where user support or usage is not expected. The support frame 204 with the different front and rear edge widths and tapering primary edge, and more generally the support device 100, is designed with aerodynamic in mind.

In another example, the front end or edge 322 and the rear end or edge 320 of the supporting section can have approximately the same width so that no noticeable tapering can be gleaned with the naked eye, which is less preferred. In another example, the supporting section 304 may have a rectangular or trapezoidal shape. In another example, the supporting section 304 may have a different shape than the stepping cover 202 but may still be curved, rectangular, or trapezoidal as described herein.

FIG. 3B and FIG. 3F show a perspective and bottom view of the underside 328 of the support frame 204 in accordance with aspects of the invention. Ribs 338 may be distributed throughout the underside 328 and provide structural support for the support frame 204 to maintain shape and material strength when a passenger steps on and applies force to the support device 100. For example, the contact surface 332 can flex or bend when stepped thereon by a passenger. But when the ribs 338 are provided, the contact surface 332 is reinforced by the rib and can resist flexing or bending when loaded by the weight of the passenger. In an example, lengthwise and crosswise ribs may be provided, which form a plurality of generally square or rectangular intersecting ribs. In other examples, the ribs 338 may embody other shapes, such as triangular, hexagonal, or diamond shaped. The ribs 338 that occupy under the mounting section 302 may have a deeper depth than the ribs 338 that occupy the supporting section 304. In another example, the ribs 338 of the mounting section 302 and supporting section 304 may have the same depth.

In an example, the support frame 204 may be made from polypropylene reinforced with glass fiber. In an example, material used to fabricate the support frame 204 is polypropylene with between %15 to %45 glass fiber contents. In a preferred example, the support frame 204 may be made from polypropylene with 30% glass fiber, commercially known as PP GF30. However, other comparable, durable, and rigid plastic may be used, such as PEEK, PEKK, PEK, and POM, which are known as engineered plastics.

The first and second set of bolt holes 306, 308 may have reinforcing frames 342 surrounding each bolt hole on the underside 328 of the support frame 204. Each reinforcing frame 342 can embody a stub 342a having a wall thickness of about 5 mm-12 mm, with 8 mm being preferred and a central opening defining the bolt holt. The relatively thick wall of the stub 342a provides bulk and improves the hoop strength of the bolt holt. A plurality of connecting ribs 342b connect the stub 342a to adjacent lengthwise and widthwise ribs 338. In an example, there can be 3 to 8 connecting ribs 342 for each reinforcing frame 342. In an example, the lengthwise and widthwise ribs 338 are taller than the connecting ribs 342b. Each of the first and second bolt holts 306, 308 therefore has a depth defined by the height of the reinforcing frames 342, which has a stub 342a and a plurality of connecting ribs 342b.

The reinforcing frames 342 can provide additional support for the bolt holes, as opposed to merely providing an opening through the surface layer of the upper surface 312 of the mounting section 302, when inserting fastening elements through the bolt holes to fasten the support frame 204 to the underbody of the vehicle. The reinforcing frames 342 may be made from the same material that the support frame 204 is made from. For example, the reinforcing frames 342 can be unitarily formed with the support frame 204. The reinforcing frames 342 may have any shape, such as a star shape or a cross shape. The third and fourth set of fastening holes 316, 334 may also be supported with similar reinforcing frames 342 on the underside 328 of the support frame 204.

With reference now to FIGS. 3B and 3F, openings 326 of the detent pockets 325 create a passageway from the contact surface 332 side to the underside 328 of the support frame 204. A detent lip 344 can be provided at or adjacent each opening to interlock with a male detent 402 on the stepping cover 202 when the stepping cover attaches to the support frame, as further described elsewhere herein. The detent lip 344 may include a tab or a plurality of tabs extending downwards from the underside 328 to engage and interlock with the male detent 402. In an example, 3 to 8 detent lips 344 may be randomly spaced, evenly spaced, or spaced at desired locations from each other on the underside 328 of the support frame 204.

In another example, the plurality of detent pockets 325 are without openings to the underside 328 but may still have the detent lips 344 situated in the cavities of the detent pockets 325. As a result, the plurality male detents 402 may engage with the plurality of detent lips 344 without penetrating the underside 328 of the support frame 204 because the detent lips 344 would be located within the detent pockets 325 at the boundary edge 324 on the second riser 329.

Figure 4A:
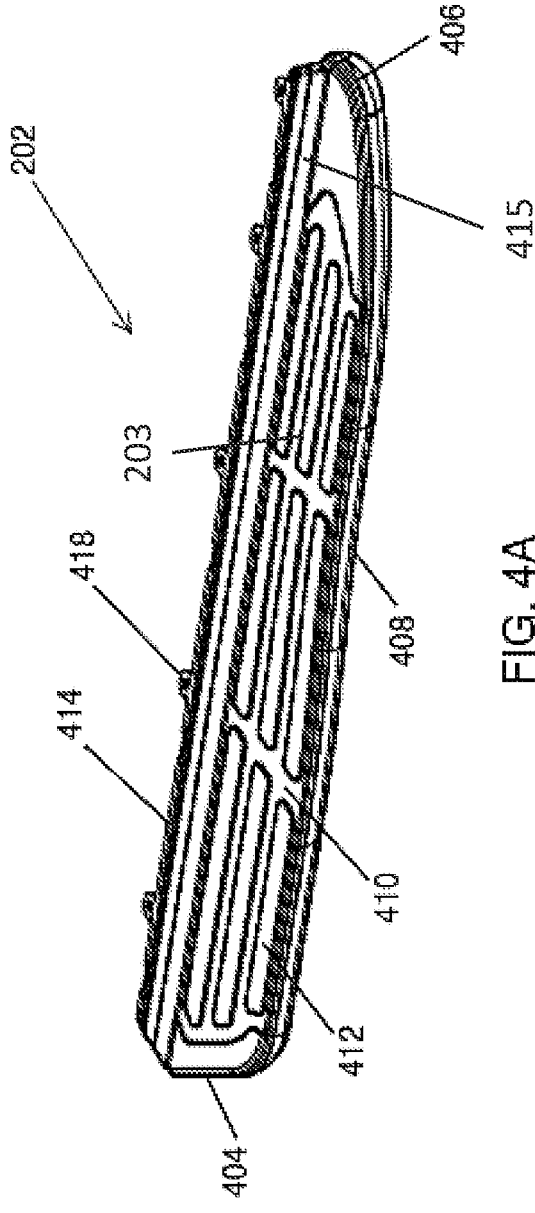
FIG. 4A is a perspective view of a stepping cover of the support device, in accordance with aspects of the invention.
Figures 4B, 4C, 4D, 4E:
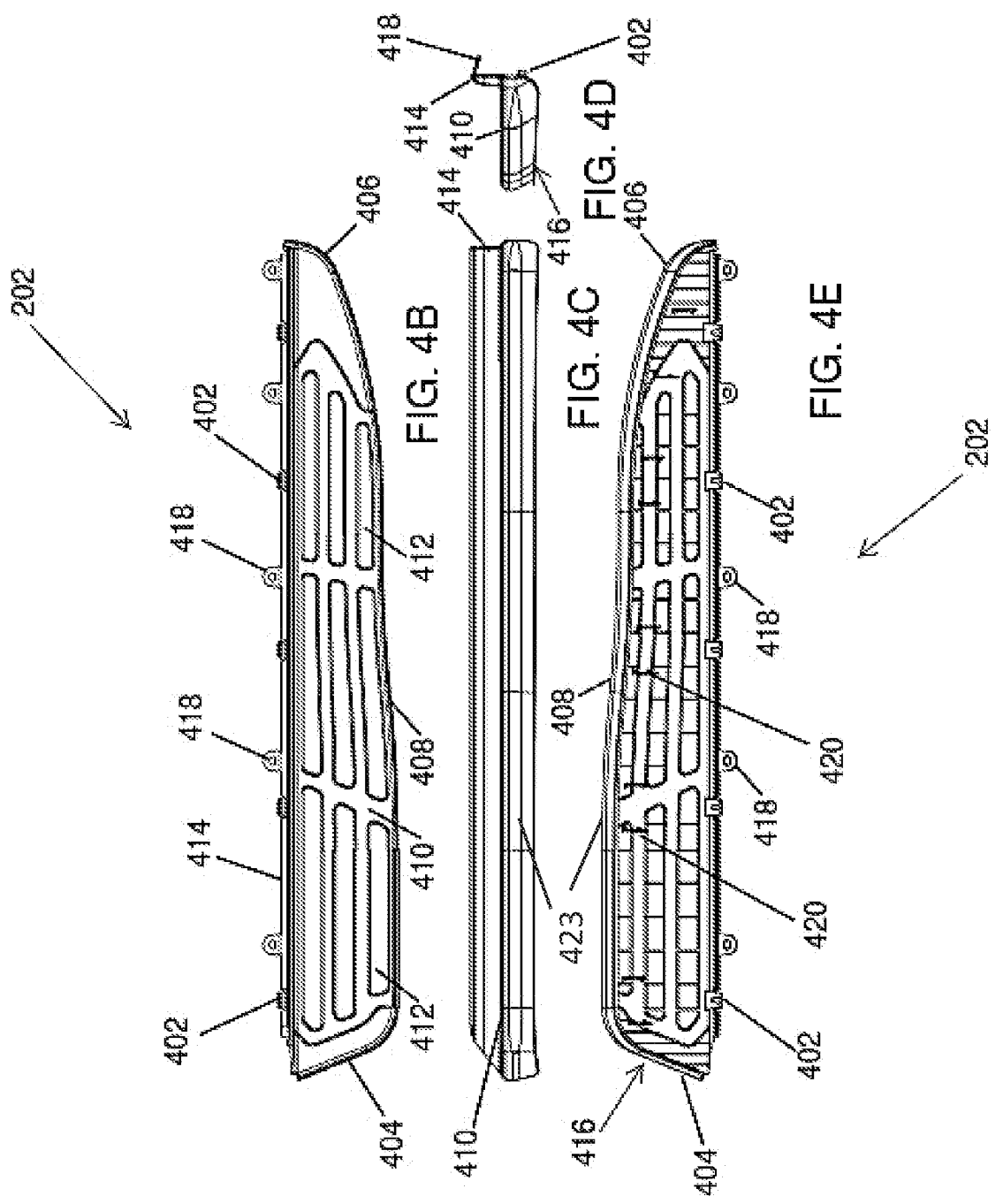
FIG. 4B is a top view of the stepping cover of the support device, in accordance with aspects of the invention.
FIG. 4C is a front view of the stepping cover of the support device, in accordance with aspects of the invention.
FIG. 4D is a side view of the stepping cover of the support device, in accordance with aspects of the invention.
FIG. 4E is a bottom view of the stepping cover of the support device, in accordance with aspects of the invention.

FIG. 4A shows a perspective view of a stepping cover 202 of the support device 100 provided in accordance with aspects of the invention. The stepping cover 202 attaches to the supporting section 304 of the support frame 204 to provide a refined finish for the support device 100 of the present invention. The stepping cover 202 can also add features to the support frame 204, such as including texture for gripping, colors, and designs, such as shapes and contours. The stepping cover 202, to be assembled to the support frame 204 to form the support device 100 in accordance with aspects of the invention, provides a stepping surface to support a passenger during ingress and egress to and from the vehicle or when reaching the roof of the vehicle.

In another example, the stepping cover 202 may be integrated with the support frame 204 as a one-piece component, such as by co-molding or over-molding two different molding materials to form the support device as an integrated unit. Less preferred, the support device 100 is practiced without the stepping cover 202 as the user can step directly onto the contact surface 332 of the support section 304 of the support frame 204.

In an example, the stepping cover 202 has a rear end or edge 404, a front end or edge 406, and a primary or long edge 408. The rear edge and the front edge are understood to be with reference to the direction of the vehicle when the stepping cover 202 is mounted to the vehicle. The rear edge 404 and the front edge 406 may alternatively be referred to as the first edge 404 and the second edge 406, respectively. In an example, the rear end 404 is wider than the front end 406, measured from the referenced plane of the riser 415. As the two ends 404, 406 vary in widths, the primary edge 408 tapers towards the narrower front end 406.

In an example, the primary edge 408 is generally constant from the rear end 404 to about a midway point between the two ends 404, 406 and then the primary edge tapers towards the front edge or end 406. In this way, the relative widths of the rear end 404 and the front end 406 provide sufficient support surface where needed and a smaller surface profile where the need is less, such as at the front end. The stepping cover 202 should have a body 203 that mates with the body of the support frame 204. Preferably, the stepping cover should have a body that is form fitting over the body of the support frame. The stepping cover 202, and more generally the support device 100 with the stepping cover, can be more aerodynamic than a comparable running board with a higher profile or where there is no taper along the primary edge. In another example, the front end 406 and the rear end 404 of the stepping cover 202 can have approximately the same width so that no noticeable tapering on the primary edge can be gleaned with the naked eye. In another example, the stepping cover 202 may have a rectangular or trapezoidal shape, which is less preferred.

The stepping cover 202 may have the same shape as the supporting section 304 of the support frame 204, as previously discussed. In another example, the stepping cover 202 may have a different shape than the supporting section 304 of the support frame. For example, the body 203 of the stepping cover can be larger, wider, or include edge features not found on the support frame. Even with a different shape that is not complementary, the stepping cover 202 can still mount onto the support frame 204, preferably with the two ends 404, 206 and the primary edge 408 encasing or surrounding the two ends and long edge of the support frame.

The stepping surface 410 of the stepping cover 202 may have a plurality of surface textures 412, which can embody projections, bumps, and/or ribs that break up the smooth stepping surface 410 to provide improved gripping or friction. The surface textures 412 may run continuously along the stepping surface 410 or may be divided into subsections along the longitudinal length of the stepping cover 202, as shown in FIG. 4A and FIG. 4B. In an example, the surface textures 412 may be divided into 3 subsections where the first subsection is located proximate the rear edge or end 404, the second subsection is located around the middle section of the body 203, and the third subsection is located proximate the front edge or end 406 of the stepping cover 202. The surface textures 412 may be divided into more or less subsections depending on the design of the support device 100 and how much friction traction is needed. In another example, the surface textures 412 may be replaced by a plurality of gripping circles, holes, or other shapes, such as stars, to provide the friction traction for the passenger to step on the stepping surface 410 of the stepping cover 202.

The surface textures 412 embody embossed surfaces on the stepping surface 410 where the surface textures 412 protrude upwardly from the stepping surface 410. In another example, the surface textures 412 may be formed as rough surfaces by indenting a plurality of grooves or dimples on the stepping surface 410. In another example, the surface textures 412 may be made from a grip tape material, which can be applied directly via adhesive onto the stepping surface.

FIG. 4B shows a top view of the stepping cover 202 and FIG. 4D shows an end view thereof. With continued reference to FIGS. 4B and 4D, a set of male detents 402 are shown, which are configured to engage and interlock with the detent lips 344 of the support frame 204 shown in FIG. 3F. The male detents 402 may embody as tabs extending outwardly opposite the front edge to engage with complementary detent lips 344s (FIGS. 3B and 3C) of the support frame 204. By way of example, a male detent 402 may be hook-shaped and configured to grip the extending tab of the detent lip 344. In an example, the engagement and interlocking between a pair of male detent 402 and detent lip 344 may be similar to a ratchet engagement mechanism. For example, the male detent 402 may easily engage the detent lip 344 by sliding past the locking tab of the detent lip 344 but difficult to disengage since the locking tab provides an obstacle or an obstruction that prevents or deters the male detent 402 from disengaging.

The set of male detents 402 may be located at or proximate the engaging edge 414 of the stepping cover 202. Each male detent 402 may extend from the undersurface 416 of the stepping cover 202 at location below the fastening holes 418, proximate the riser element 412 shown in FIG. 4D. Each male detent 402 may angled as appropriate to facilitate engagement with the detent pocket of the stepping cover 202. In an example, 3 to 8 male detents 402 may be incorporated with the stepping cover 202. There should be the same number of male detents 402 as the detent pockets 325. The male detents may be randomly spaced, evenly spaced, or spaced at desired locations from each other and correspond to the spacing of the detent pockets 325.

The engaging edge 414 of the stepping cover 202 may also incorporate fastening holes 418 to align with the third set of fastening holes 316 of the mounting section shown in FIG. 3C. The corresponding fastening holes 418 may protrude outwards from the engaging edge 414. The corresponding fastening holes 418 may be used to fasten the stepping cover 202 to the support frame 204 using fastening elements such as bolts or screws. As shown in FIG. 4D, the stepping cover may have a riser element 415 near the engaging edge 414, and the engaging edge 414 may be at a higher level relative to the stepping surface 410. Since corresponding fastening holes 418 may be orientated around the engaging edge 414, the corresponding fastening holes 418 may also be at a higher level relative to the stepping surface 410 because of the riser element 415. The corresponding fastening holes 418 may be sloped downwards away from the riser element 415. In an example, the corresponding fastening holes 418 may include between 3 to 8 fastening holes that may be randomly spaced, evenly spaced, or spaced at desired locations from each other.

In an alternative embodiment, the fastening holes 418 may be replaced by a different fastening mechanism type, such as embossed protrusions and edge lips for engaging the recesses 317, shown in FIG. 3C. In another alternative embodiment, instead of utilizing the corresponding set of fastening holes 418, the engaging edge 414 may have mating structural openings or similar features that can engage the bosses or projections of corresponding rounded recesses 317 of the support frame 204. This alternative engagement can prevent the stepping cover 202 from separating from the support frame 204 and, when further abutted against the underside surface of the vehicle when in the installed position, the engagement can be substantially permanent and secured. In another example, the mating structural openings or similar features of the stepping cover 202 may be interchanged with the bosses or projections of the support frame 204.

As shown in FIG. 4E, the undersurface 416 of the stepping cover 202 may be hollow or has a cavity for receiving the contact surface 332 of the supporting section 304 shown in FIG. 3A. The hollow space or cavity may be formed, at least in part, by a downwardly extending skirt 423 that extends from the stepping surface 410 and follows the contour of the outer edge of the stepping surface 410. In the example shown, the skirt 423 terminates at the two ends 404, 406, and not extend along the engaging edge 414. As an example, when installed on top of the supporting section 304, the rear edge or end 404, the primary edge 408, and the front edge or end 406 of the stepping cover 202 may substantially cover the corresponding edge or side of the supporting section 304, as shown in FIGS. 2A and 2B.

The undersurface 416 of the stepping cover 202 may also have a plurality of protruding tabs 420 configured to align and be inserted in the plurality of slots 330 on the contact surface 332 of the support frame 204 shown in FIG. 3A. The engagement may prevent the stepping cover 202 from sliding laterally relative to the contact surface 332 of the support frame 204. Such protruding tabs 420 may be randomly spaced, evenly spaced, or spaced at desired locations throughout the length of the stepping cover 202, but match with the locations of the slots 330.

The stepping cover 202 may be made from a thermoplastic polymer material. In an example, the stepping cover 202 may be made from a thermoplastic polyolefin (TPO) material. TPO compounds are resin blends of polypropylene (PP) and un-crosslinked EPDM rubber and polyethylene. TPO compounds are characterized by high impact resistance, low density and good chemical resistance. TPO compounds can be used in applications where there is a requirement for increased toughness and durability over conventional PP copolymers, such as automotive bumpers and dashboards. TPO compounds can be processed by injection molding, extrusion molding, or blow molding.

Figures 5A, 5B:
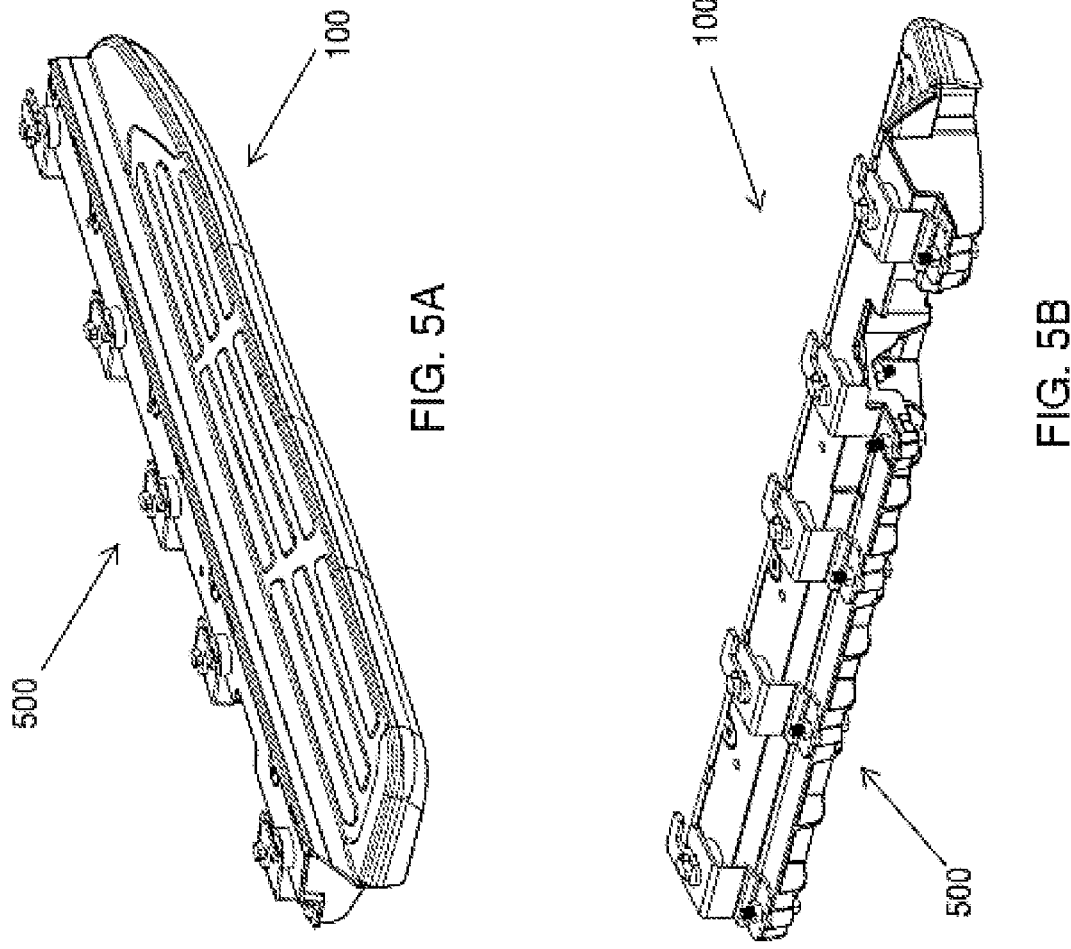
FIG. 5A is a front perspective view of the support device having a mounting assembly incorporated, in accordance with aspects of the invention.
FIG. 5B is a rear perspective view of the support device having a mounting assembly incorporated, in accordance with aspects of the invention.

FIG. 5A and FIG. 5B show a front and rear perspective view of the support device 100 having a mounting assembly 500 incorporated for attaching the support device 100 to an underside of a vehicle in accordance with aspects of the invention. The mounting assembly 500 may be configured to fasten the support device 100 to the underbody of the vehicle. Various aspects of the mounting assembly 500, including structures, features, and mounting, are described in U.S. publication numbers 2020/0339204 and 2022/0105870, the contents of which are expressly incorporated herein by reference, including for the teachings of the mounting assembly 500.

Figures 5C, 5D:
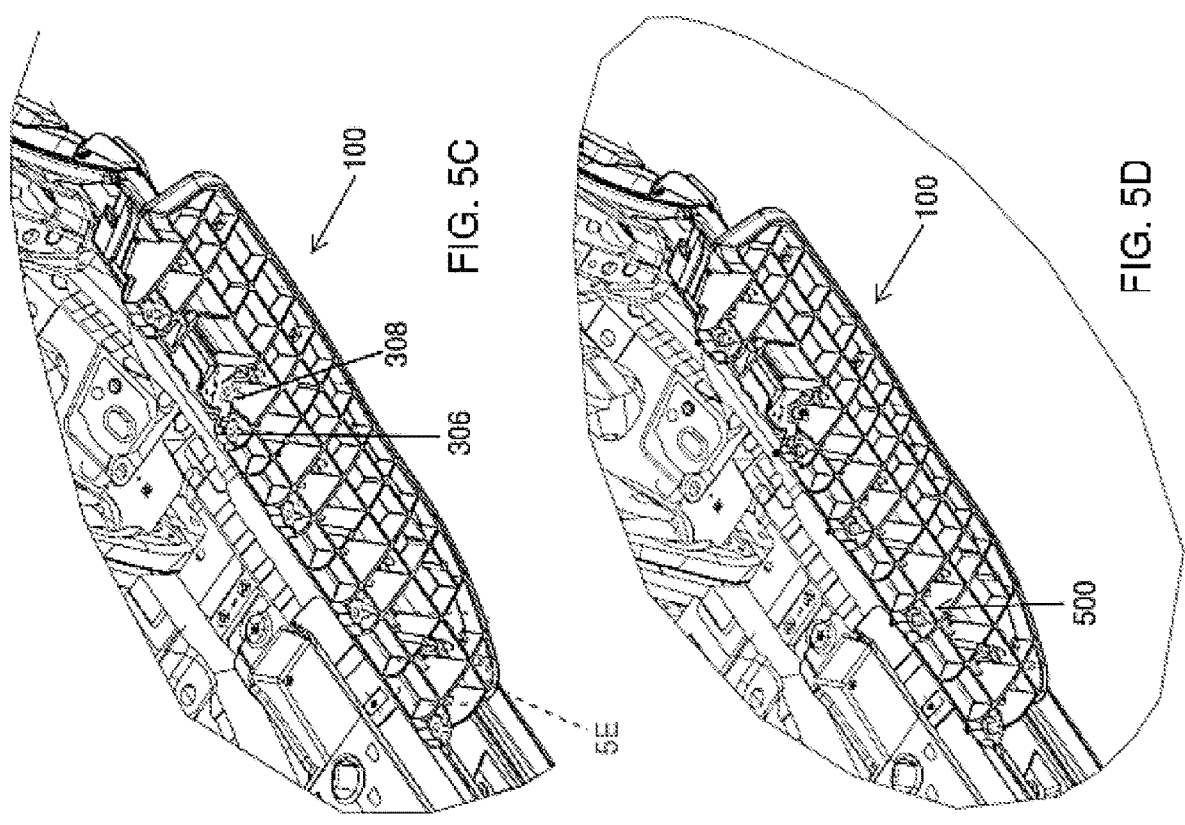
FIG. 5C is a bottom view of the support device placed next to the underbody of the vehicle, in accordance with aspects of the invention.
FIG. 5D is a bottom view of the support device mounted by the mounting assembly to the underbody of the vehicle, in accordance with an alternative embodiment of the invention.

FIG. 5C shows a bottom view of the support device 100 placed against the underbody of a vehicle, prior to using the mounting assembly 500, and FIG. 5D shows a bottom view of the support device 100 mounted to the underbody of the vehicle using the mounting assembly 500 in accordance with aspects of the invention. As shown in the figures, the fastening components of the mounting assembly 500 may fasten the support device 100 to the underbody of the vehicle using the first and second set of bolt holes 306, 308.

Figure 5E:
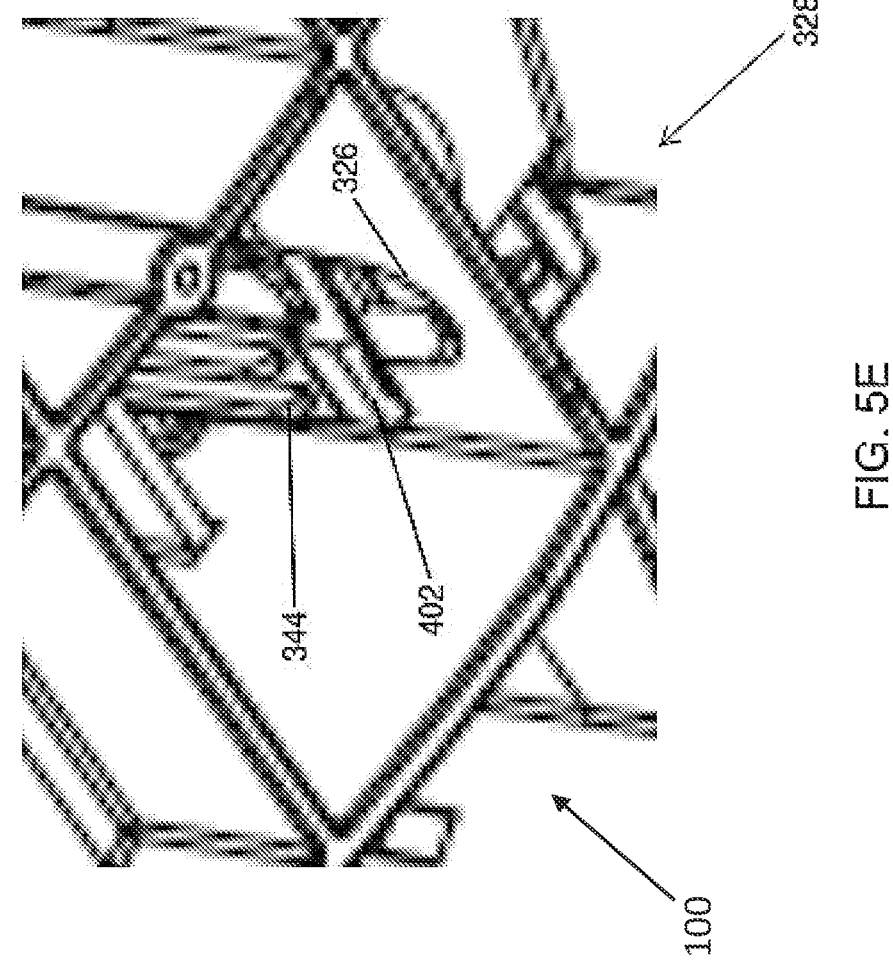
FIG. 5E is a bottom close-up view of the support device with a detent lip engaging and interlocking with a male detent.

FIG. 5E shows a bottom close-up view of the support device 100 with a detent lip 344 of the support frame interlocking with a male detent 402 of the stepping cover. The male detent 402 may reach the underside 328 of the support frame through an opening 326 and engage with the detent lip 344. The detent lip 344 may be a tab or a plurality of tabs protruding downwards away from the underside 328. The male detent 402 may have a hook-shaped tab extending outwards to engage and interlock with the detent lip 344.

Figure 6:
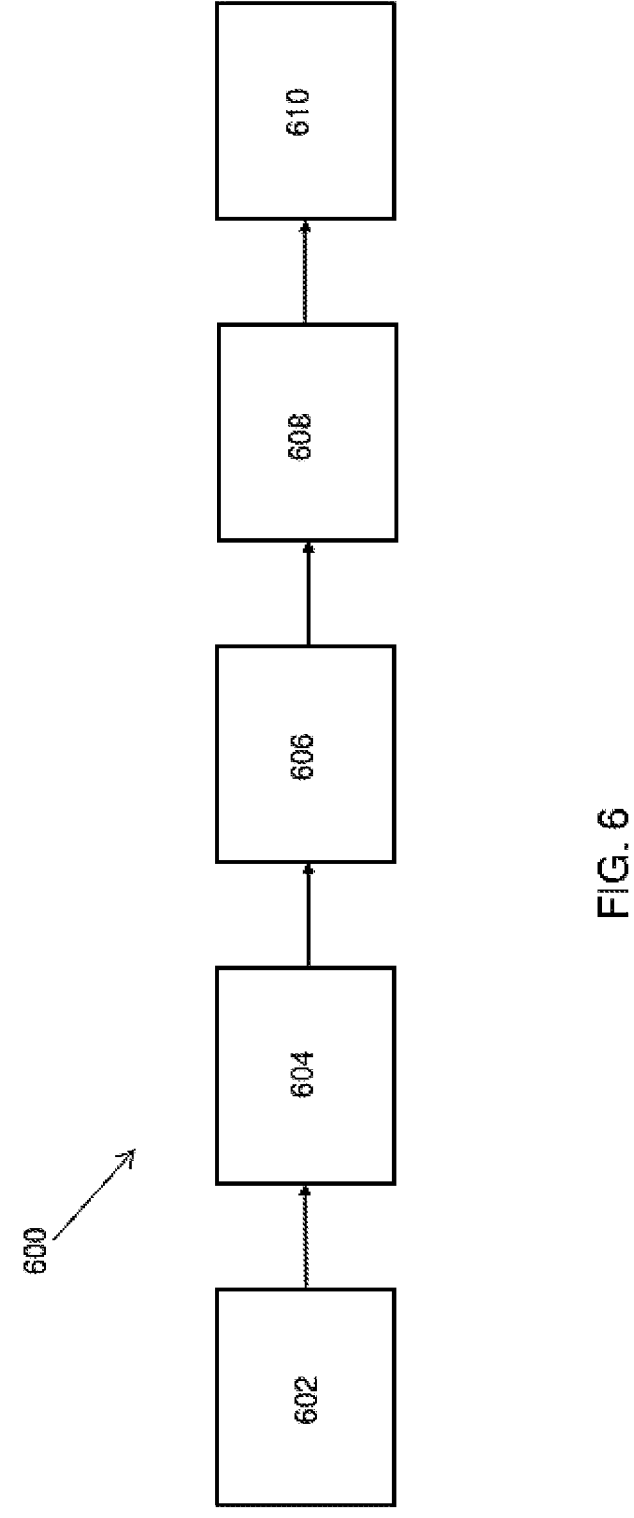
FIG. 6 is a block diagram of a method of using the support device to get inside the vehicle.

FIG. 6 shows a block diagram describing a method of using the support device 600 to get inside the vehicle. The passenger can open a passenger door of a vehicle at step 602. The passenger can step onto the support device 100 discussed herein with either foot at step 604. The passenger may generate a lifting force by pushing with the foot contacting the support device to lift passenger's whole body off the ground at step 606. The passenger may then enter the passenger compartment of the vehicle at step 608. Alternatively, the passenger may stand atop the support device to gain access to areas of objects on the roof, such as a roof-mounted cargo box at step 608 before entering the passenger compartment. The passenger can then close the vehicle door once inside the passenger compartment at step 610.

Methods of making and of using support devices 100 and their components are understood to be within the scope of the present disclosure.

Although limited embodiments of support devices and assemblies and their components have been specifically described and illustrated herein, many modifications and variations will be apparent to those skilled in the art. For example, the various support devices may incorporate custom paint, have different outer contoured shapes, provided with metallic overcoats, etc. Furthermore, it is understood and contemplated that features specifically discussed for one support device embodiment may be adopted for inclusion with another support device embodiment, provided the functions are compatible. Accordingly, it is to be understood that the support devices and assemblies and their components constructed according to principles of the disclosed device, system, and method may be embodied other than as specifically described herein. The disclosure is also defined in the following claims.

What is claimed is:

1. A support device for a passenger door of a vehicle comprising:
   a stepping cover attached to a support frame that is configured to fasten to an underbody section of the vehicle near the passenger door;
   the stepping cover having a stepping surface defined by a primary edge located between a rear edge and a front edge, wherein the primary edge has an edge section that tapers towards the front edge and the stepping cover having an engaging edge with a plurality of male detents;
   the support frame comprising:
      a mounting section having a first set of bolt holes on a first surface level, a second set of bolt holes on a second surface level higher, elevation-wise, than the first surface level, and a set of openings providing routes to an underside of the support frame along a boundary between the mounting section and a supporting section, the supporting section disposed laterally outward relative to the mounting section;
      the supporting section having a shape for accepting the stepping cover and being located on a surface that is lower, elevation-wise, than the second surface level of the mounting section; and
      the underside having a detent lip proximate each of the set of openings near the boundary; and
      wherein the plurality of male detents engage the plurality of detent lips.

2. The support device of claim 1, wherein the support device has a length that is less than 65% of a length of the vehicle between front and rear wheel wells of the vehicle.

3. The support device of claim 1, wherein the mounting section further includes a set of fastening holes on the second surface level, and the engaging edge has a corresponding set of fastening holes configured for fastening the stepping cover to the support frame.

4. The support device of claim 1, wherein the mounting section has a cut-out for a jacking point of the vehicle.

5. The support device of claim 1, wherein a reinforcing frame surrounds each of the first and second set of bolt holes.

6. The support device of claim 1, wherein the stepping surface has a plurality of surface textures protruding outwards from the stepping surface.

7. The support device of claim 1, wherein the support frame is made from a polypropylene compound having a percentage of glass fiber.

8. The support device of claim 7, wherein the stepping cover is made from a thermoplastic polyolefin compound.

9. A support device for a passenger door of a vehicle comprising:

a stepping cover attached to a support frame that is configured to fasten to an underbody section of the vehicle;

the stepping cover having a body with a stepping surface, a skirt depending from the stepping surface, and a riser extending upwardly of the stepping surface;

the support frame having a mounting section having a first set of bolt holes on a first surface level, a second set of bolt holes on a second surface level higher, elevation-wise, than the first surface level, and a supporting section disposed outward from the mounting section comprising a mounting surface and a side surface below the mounting surface;

wherein the stepping surface of the stepping cover overlies the mounting surface of the supporting section and the skirt covers at least part of the side surface below the mounting surface; and wherein the support frame has a length that is less than 65% of a length of the vehicle between front and rear wheel wells of the vehicle.

10. The support device of claim 9, wherein the support device occupies only an area under the passenger door of the vehicle.

11. A support device for a passenger door of a vehicle comprising:

a stepping cover attached to a support frame that is configured to fasten to an underbody section of the vehicle;

the stepping cover having a body with a stepping surface, a skirt depending from the stepping surface, and a riser extending upwardly of the stepping surface;

the support frame having a mounting section having a first set of bolt holes on a first surface level, a second set of bolt holes on a second surface level higher, elevation-wise, than the first surface level, and a supporting section comprising a mounting surface and a side surface below the mounting surface;

wherein the stepping surface of the stepping cover overlies the mounting surface of the supporting section and the skirt covers at least part of the side surface below the mounting surface; and wherein the support frame has a length that is less than 65% of a length of the vehicle between front and rear wheel wells of the vehicle, wherein the support frame has a cut-out for a jacking point of the vehicle.

12. The support device of claim 9, wherein the support frame has a cut-out that interrupts a continuous edge of the mounting section.

13. A method of manufacturing a support device of claim 1.

14. A method of manufacturing a support device of claim 9.

15. A method of using a support device of claim 1.

16. A method of using a support device of claim 9.

17. The support device of claim 1, wherein the front edge has a narrower width than the rear edge such that the edge section is tapered according to the relative widths of the front edge and the rear edge.

\* \* \* \* \*